United States Patent
Manning et al.

(10) Patent No.: US 7,052,188 B2
(45) Date of Patent: May 30, 2006

(54) OPTICAL FIBER ASSEMBLY WITH ADJUSTABLE FIBER RADIAL ORIENTATION

(76) Inventors: Randy Marshall Manning, 824 Indiana Ave., Lemoyne, PA (US) 17043; Soren Grinderslev, 1554 MacIntosh Way, Hummelstown, PA (US) 17036; David Erdman, 7101 Silver Fox Ct., Hummelstown, PA (US) 17036; Mike Gurreri, 2156 Rillian La., York, PA (US) 17404

( * ) Notice: Subject to any disclaimer, the term of this patent is extended or adjusted under 35 U.S.C. 154(b) by 60 days.

(21) Appl. No.: 10/473,901

(22) PCT Filed: Apr. 2, 2002

(86) PCT No.: PCT/US02/10280

§ 371 (c)(1),
(2), (4) Date: Oct. 2, 2003

(87) PCT Pub. No.: WO02/079840

PCT Pub. Date: Oct. 10, 2002

(65) Prior Publication Data

US 2004/0131316 A1    Jul. 8, 2004

Related U.S. Application Data

(60) Provisional application No. 60/280,777, filed on Apr. 2, 2001.

(51) Int. Cl.
*G02B 6/36*    (2006.01)

(52) U.S. Cl. .............................. 385/78; 385/56; 385/84; 385/90

(58) Field of Classification Search .................. 385/60, 385/65, 66, 70, 72, 76–78, 84
See application file for complete search history.

(56) References Cited

U.S. PATENT DOCUMENTS

| | | | | |
|---|---|---|---|---|
| 5,136,681 | A * | 8/1992 | Takahashi | 385/140 |
| 5,633,970 | A * | 5/1997 | Olson et al. | 385/78 |
| 5,946,436 | A * | 8/1999 | Takashi | 385/60 |
| 6,287,018 | B1 * | 9/2001 | Andrews et al. | 385/60 |
| 6,428,215 | B1 * | 8/2002 | Nault | 385/78 |
| 6,547,452 | B1 * | 4/2003 | Chan et al. | 385/88 |
| 6,663,293 | B1 * | 12/2003 | Lampert et al. | 385/78 |

\* cited by examiner

*Primary Examiner*—John D. Lee
*Assistant Examiner*—Omar Rojas

(57) ABSTRACT

An optical fiber assembly kit (7) comprising: (a) a ferrule assembly (1) having at least one bore hole to receive an optical fiber and a first contact surface; (b) a positioning member (2) having a second contact surface and an aperture adapted to receive the ferrule assembly (1), wherein the first contact surface and the aperture are configured to form a first interface in which a first radial position relationship between the ferrule assembly (1) and the positioning member (2) is maintained; (c) a housing having an interior cavity adapted for receiving the positioning member (2) and the ferrule assembly (1), the housing and the second surface of the positioning member (2) are configured to form a second interface such that a second radial position relationship between the positioning member (2) and the housing is maintained, wherein one of the first or second radial position relationships is adjustable in increments less than a quarter rotation, and the other radial position relationship is predetermined, and wherein the one radial position relationship has an interference fit interface.

21 Claims, 2 Drawing Sheets

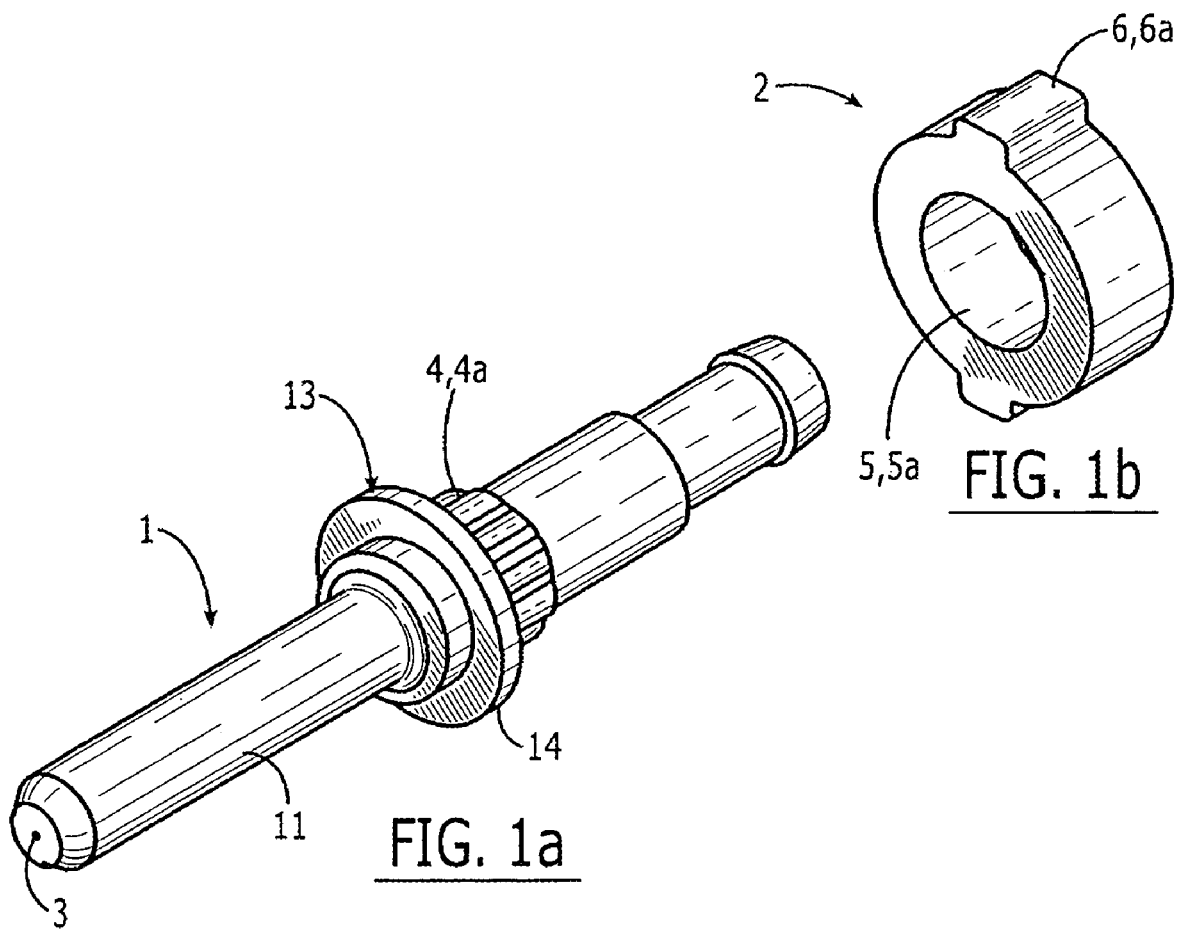
FIG. 1b
FIG. 1a
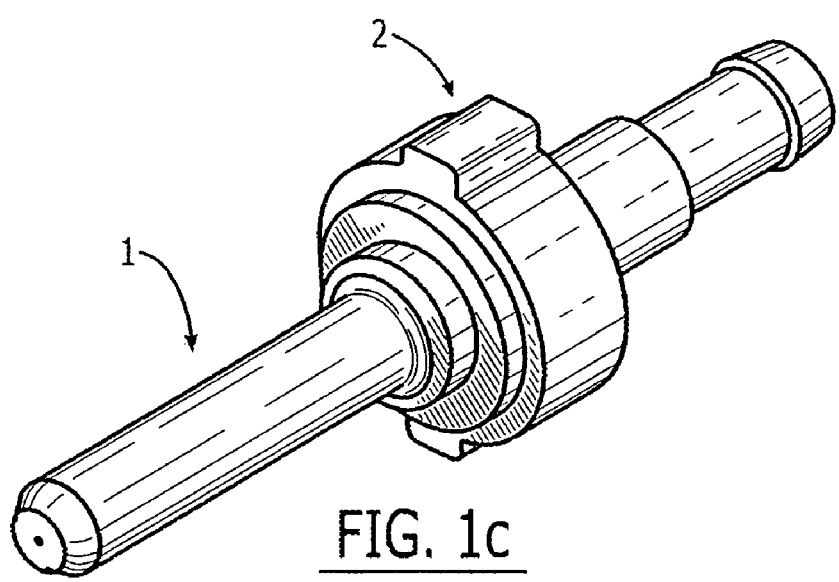
FIG. 1c

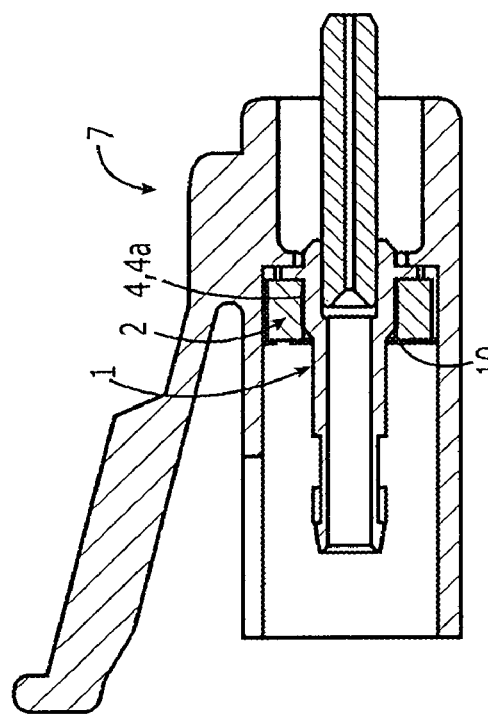
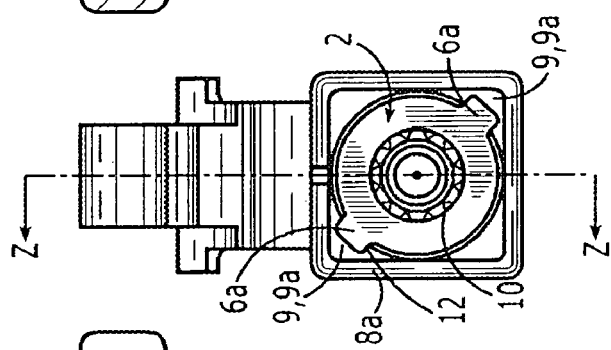
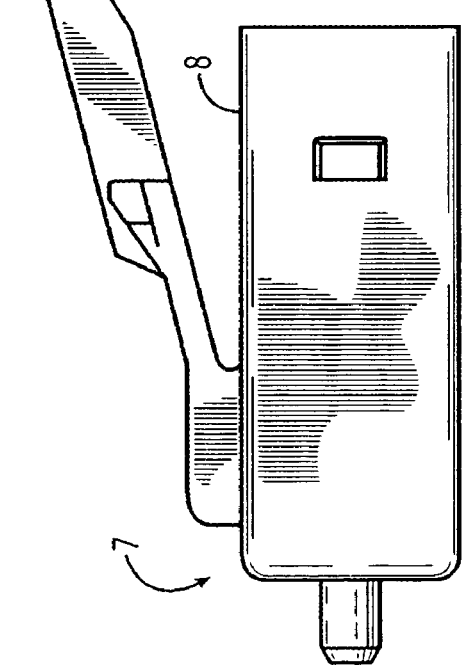

OPTICAL FIBER ASSEMBLY WITH ADJUSTABLE FIBER RADIAL ORIENTATION

CROSS-REFERENCE TO RELATED APPLICATIONS

This application is a U.S. national stage application based on International Application No. PCT/US02/10280, filed Apr. 2, 2002, which claims priority benefit under 35 U.S.C. § 119(e) to U.S. Provisional Application No. 60/280,777, filed Apr. 2, 2001, the disclosures of which are incorporated herein by reference.

FIELD OF INVENTION

The present invention relates generally to an optical connector, and, more specifically, to an optical connector in which the radial position of the fiber relative to the connector is adjustable.

BACKGROUND OF INVENTION

Optical fiber connectors are an essential part of substantially all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of optical fiber connectors is to hold an optical fiber such that its core is axially aligned with the optical path of the device to which the connector is mating (e.g., another fiber). This way, the light from one fiber is optically coupled to the optical path of the mating device.

Often there is a need to define the optical fiber's radial position with respect to the connector. Such a need arises, for example, with the use of polarization maintaining (PN) optical fibers. To connect polarization-maintaining optical fibers or to connect a polarization-maintaining optical fiber and another device, the polarization planes of the fibers need to coincide with each other with a high degree of accuracy. For this reason, the connection relies on the individual radial adjustment of each fiber.

Another instance in which it is desirable to set the radial position of the fiber relative to the connector is in the use of single mode fibers. More specifically, it is common in single mode applications to use fibers which have beveled end faces. The beveled end face is usually about 7° off perpendicular from the optical transmission path of the fiber, and insures that any light which is reflected from the end face interface is not reflected back down the optical transmission path. This way, damage to the light generating source (e.g. laser) is avoided. Since the end faces of mating single mode fibers are beveled, if they are not radially aligned with one another, their bevels will not be complementing, but rather interfering such that a gap between the end faces results when the fibers are mated. Therefore, to ensure that the beveled end faces mate in a complementary fashion, it is essential that each fiber be held in the mating connectors in a particular radial position.

Yet another instance in which a fiber's radial position with respect to the connector is critical is in minimizing the insertion loss of a connector. More specifically, due to the asymmetry typically found in ferrules (e.g., non-axial alignment of the fiber and apex offset), light transmission between mating ferrules is a function of the radial orientation between the two mating ferrules. Therefore, it is desirable to establish the radial position of the fiber relative to the housing of the connector such that insertion losses are minimized.

Traditional approaches for effecting the relative radial position of the optical fiber to the connector tend to be either complicated or too coarse to realize the precise radial positioning often required. For example, a popular approach for radially positioning the fiber in a LC type connector involves securing the fiber to the ferrule and then moving the ferrule assembly in quarter rotation increments until the lowest insertion loss of the four different positions is determined. Although this approach provides for some tuning of the connector, the applicants recognize that often times four predetermined radial positions are not adequate to realize the low insertion loss potential of the connector.

Another approach for establishing the radial position of the optical fiber relative to the connector is described in U.S. Pat. No. 5,668,905 (herein referred to as the 905 patent). The 905 patent is directed to establishing the radial position of a polarization maintaining fiber in an optical connector. It involves sliding an angular index member over the ferrule assembly and then, while viewing the fiber under a microscope, rotating the ferrule assembly until the desired alignment with respect to the microscope is achieved. At this point, adhesive is applied to the interface of the angular index member and the ferrule assembly such that the angular index member becomes fixed to the ferrule assembly. This assembly then is incorporated into an optical connector in which the radial position of the angular index member and the housing of the connector is predetermined. Although this approach is effective in establishing a high degree of "tuning" with respect to the radial position of the fiber to the housing, its use of adhesive tends to complicate its implementation and limit the conditions under which this radial alignment approach can be undertaken.

Additionally, applicants note that the angular index member used in the 905 patent will tend to introduce a certain amount of play between the ferrule assembly and the housing. More specifically, since the radial positioning means on the annular index member (i.e., the key ways) have very little radial offset from the center of the ferrule assembly, any tolerance in the key way will tend to have a significant impact on the radial orientation of the ferrule assembly.

Therefore, there is a need for establishing the radial position of the fiber relative to the connector which is simple and effective. The present invention fulfills this need among others.

SUMMARY OF INVENTION

The present invention provides an approach for establishing the radial orientation of an optical fiber within a connector which overcomes the aforementioned problems in the prior art. More specifically, the connector employs at least one ferrule assembly, a positioning member adapted to receive the ferrule assembly, and a housing adapted to receive the positioning member. The ferrule interengagement with the positioning member defines a first interface and the positioning members interengagement with the housing defines a second interface. One interface provides for the radial adjustment of the fiber (herein the "adjustment interface"), while the other interface has a predetermined orientation with respect to either the connector or the ferrule assembly.

The adjustment interface is preferably an interference fit to afford essentially infinite radial adjustment of the subject components for unprecedented radial alignment precision.

Furthermore, the use of an interference fit avoids an assembly process which is complicated by adhesives or other complicated fixturing approaches.

Additionally, by using two readily-effected interfaces, time and effort in establishing proper radial alignment may be segregated to the particular subassembly comprising the adjustable interface. This subassembly may then be readily combined with the other components of the connector in a simple process in which the predetermined interface is effected. Therefore, an advantage of the two interface approach is that a subassembly may be prepared at a different time and place than the rest of the connector assembly to exploit economies of scale and differences in skill levels/labor costs of the workers assembling the connectors.

Accordingly, one aspect of the present invention is an optical assembly kit for assembling a radially-orientated fiber connector. In a preferred embodiment, the optical fiber assembly kit comprises: (a) a ferrule assembly having at least one bore hole to receive an optical fiber and a first contact surface; (b) a positioning member having a second contact surface and an aperture adapted to receive said ferrule assembly, wherein said first contact surface and said aperture are configured to form a first interface in which a first radial position relationship between said ferrule assembly and said positioning member is maintained; (c) a housing having an internal cavity adapted for receiving said positioning member and said ferrule assembly, said internal cavity and said second surface of said positioning member are configured to form a second interface such that a second radial position relationship between said positioning member and said housing is maintained; and (d) wherein one of said first or second radial position relationships is adjustable in increments less than a quarter rotation, and the other radial position relationship is predetermined, and wherein the adjustable radial position relationship is maintained by an interference fit interface.

Another aspect of the present invention is an optical fiber assembly comprising both the adjustable interface and the predetermined interface. In a preferred embodiment, the assembly comprises: (a) an optical fiber; (b) a ferrule assembly having a first contact surface and at least one bore hole in which said optical fiber is disposed; (c) a positioning member having a second contact surface and an aperture in which said ferrule assembly is disposed thereby defining a first interface in which a first radial position relationship between said ferrule assembly and said positioning member is maintained; (d) a housing in which said positioning member and said ferrule assembly are disposed, said housing and said second surface of said positioning member define a second interface such that a second radial position relationship between said positioning member and said housing is maintained; and (e) wherein the interface associated with one of said first or second radial position relationship is an interference fit and said one radial position relationship is adjustable in increments less than a quarter rotation prior to effecting the interface, and the other radial position relationship is predetermined.

Yet another aspect of the present invention is a method for assembling the connector in which at least the adjustable interface is effected and optionally both interfaces are effected. In a preferred embodiment, the method comprises the steps of (a) fixing an optical fiber in a ferrule assembly; (b) establishing a first radial position by fixing a first interface between the ferrule assembly and a positioning member; (c) establishing a second radial position by fixing a second interface between the positioning member and the housing, wherein establishing one of either the first or second radial position comprises radially orientating the fiber with respect to either the positioning member or the connector housing and maintaining such radial position with an interference fit at either the first or second interface.

BRIEF DESCRIPTION OF DRAWINGS

FIG. 1a shows a perspective view of the ferrule assembly of the present invention.

FIG. 1b shows a perspective view of the positioning member of the present invention.

FIG. 1c shows the positioning member of FIG. 1b mounted on the ferrule assembly of FIG. 1a.

FIG. 2a shows a profile view of a small form factor connector that incorporates the subassembly of the ferrule assembly and positioning member of FIG. 1c.

FIG. 2b shows a rear view of the connector of FIG. 2a without a fiber.

FIG. 2c shows a cross section of the connector shown in FIG. 2b along the Z plane.

DETAILED DESCRIPTION OF PREFERRED EMBODIMENT

Referring to FIGS. 1a through 2c, a preferred embodiment of the present invention is shown. The figures show an optical fiber assembly 7 comprising a ferrule assembly 1 having at least one bore hole 3 to receive an optical fiber (not shown) and a first contact surface 4. The optical fiber assembly also comprises a positioning member 2 having a second contact surface 6 and at least one aperture 5 adapted to receive a ferrule assembly 1. The first contact surface 4 and the surface 5a of the aperture are configured to form a first interface 10 in which a first position radial position relationship between the ferrule assembly 1 and the positioning member 2 is maintained. The optical fiber assembly 7 also comprises a housing 8 shown in FIGS. 2a through 2c. The housing 8 is adapted to receive the positioning member 2 and the ferrule assembly 1. The housing 8 and the second contact surface 6 of the positioning member 2 are configured to form a second interface 12 such that a second radial position relationship between the positioning member 2 and the housing 8 is maintained.

In the optical fiber assembly 7 of the present invention one of either the first or second radial position relationships is adjustable (herein, the "adjustable interface") in increments less than a quarter rotation while the other radial position relationship is predetermined. Further, preferably, the adjustable interface has an interference fit interface. In the embodiment shown in FIGS. 1a through 2c, the adjustable interface is the first radial position relationship, and, thus, the first interface 10 between first contact surface 4 and aperture 5 is an interference fit.

An important aspect of the present invention is the fact that either the first or second radial position relationship is adjustable in increments less than a quarter rotation. Therefore, the approach of the present invention offers a finer tuning than is traditionally found in the prior art. In a preferred embodiment, the increments are less then 10°, and, in an even more preferred embodiment, the radial position relationship is essentially infinitely adjustable. In other words, the interface associated with the one radial position relationship has no predetermined radial position relationships. Such a fine degree of tuning allows the connector of the present invention to realize its maximum polarization potential or its minimize insertion loss potential.

Another important aspect of the present invention is the fact that the adjustable interface preferably comprises an interference fit. Such a fit is preferable over prior art adhesive approaches from a simplicity standpoint. It is also anticipated that the interference fit of the present invention can be effected in conditions considered unsuitable for applying an adhesive bond, such as, for example, high temperatures and a moist ambient. In a preferred embodiment, the first interface 10 is the adjustable interface and comprises the interaction of textured surfaces which minimize sliding there between. In a more preferred embodiment, the first contact surface 4 is a splined surface 4a and the aperture surface 5a comprises a material which is deformable around splines 4a. For example the splines may be metal and the positioning member plastic or a softer metal. Once the desired radial position between the ferrule assembly 1 and the positioning member 2 is achieved, the positioning member can be slid over splines 4a. The ridges of splines 4a tend to deform the aperture surface 5a and prevent the radial movement between the positioning member and the edges. In other words, the positioning member cannot rotate around the ferrule assembly once the first interface 10 is effected.

Alternatively, the first contact surface 4 may be a side of a polygon defining a number of edges. Again, like the spline shaft, aperture surface 5a will tend to deform about the edges and prevent the relative motion of the positioning member relative to the ferrule assembly.

The preferred embodiment of the present invention shown in FIGS. 1a through 2c enjoys another advantage over the prior art with respect to the second interface 12. Applicants recognize that more precise control over the rotation of the ferrule assembly 1 can be achieved if the features for preventing this rotation are located away from the fiber so that any play or tolerance in these anti-rotation features is dissipated over the distance from the features to the center of the ferrule assembly. In a preferred embodiment. the protrusions 6a are located as far from the axial axis of the ferrule assembly 1 as possible. Accordingly. in a preferred embodiment of the present invention, the key protrusions 6a extend outwardly from the positioning member and are received in the diametric corners of the housing 8. More specifically, the second interface 12 preferably comprises a keyed fit between the housing 8 and the second surface 6 of the position positioning member. As shown in FIG. 2b, in a preferred embodiment, the second surface 6 comprises key protrusions 6a These protrusions 6a are more preferably keys 9a which are configured to fit snugly in receiving cavities 9 of the housing 8. Since the key protrusions 6a are held snugly by receiving cavities 9. the positioning member 2 (and, thus, the ferrule assembly 1) is unable essentially to rotate with respect to the housing 8 and, to the extent there is rotation. such rotation represents a small portion of the second interfaces perimeter and, thus. will have an equally small effect at the core of the fiber.

Referring to back to FIGS. 1a–2c, the various components of the preferred embodiment will be considered in detail and with respect to alternative embodiments. As shown in FIG. 1a, the ferrule assembly comprises a ferrule portion 11 having a bore hole 3 to receive a fiber (not shown). Such ferrules are well known in the art and include, for example, traditional ferrules such as those used in the ST and FC connectors, and small form factor ferrules, such as those used in the LC and MU-type connectors.

To facilitate the first interface, it is preferable for the ferrule assembly to comprise an interface structure 13. The interface structure 13 comprises a first contact surface 4 which is preferably a textured surface 4a to facilitate an interference fit. Suitable texturing includes, for example, splines, edges, bumps, ribs, and sand and grit. Generally, it is preferred for the textured surface 4a to be harder than the aperture surface 5a of the positioning member 2 such that the aperture surface deforms around the texturing and "fixes" the relative radial position of the two components. In this embodiment, the textured surface comprises splines running along the length of the surface. In a preferred embodiment, the interface structure also comprises a collar 14 to provide a surface upon which the positioning member 2 can seat when the first interface is effected. The collar 14 therefore establishes a stop point for the positioning member 2 along the axis of the ferrule assembly 1.

Referring to FIG. 1b, a preferred embodiment of the positioning member 2 is shown. As mentioned above, the positioning member comprises an aperture 5 for receiving the ferrule assembly 1 and forming the first interface between the aperture surface 5a and the first contact surface 4 of the ferrule assembly 1. Although the positioning member shown has just one aperture 4 for accepting just one ferrule assembly 1, it should be understood that the present invention is not limited to such an embodiment. To the contrary, this embodiment facilitates the independent radial positioning of multiple ferrule assemblies in a single positioning member prior to the positioning member's incorporation into the housing. The positioning member in such an embodiment would be larger relative to the ferrule assemblies than as depicted herein. For example, it may have a rectangular shape, rather than circular as shown, and it may have apertures arranged in one or more rows.

In this embodiment, the positioning member preferably comprises protrusions 6a which are received in predetermine cavities of the interior of the housing 8 as mentioned above. It should be understood, however, that if the second interface is the adjustable interface, then it may have a surface similar to that of the first contact surface 4, i.e., textured.

The housing 8 has an outer surface and functionality similar to traditional connector housings, although the interior space of the housing is configured to receive the ferrule assembly 1 and the positioning member 2. To receive these components, the housing defines cavities 9 for receiving the protrusions 6a. It is important to note that in this embodiment, the cavities are located diametrically in two corners. By receiving the protrusions in the corners, the diameter of the positioning member can be maximized. It is also worthwhile to note that, although two protrusions 6a on the positioning member and two cavities 9 in the housing are depicted, the invention is not limited to this configuration and other means of effecting the second interface may be used. For example, the positioning member may have four protrusions that are received in the four corners of the housing. Furthermore, rather than relying on protrusions or other surface anomalies on the second contact surface to interengage with the housing and prevent radial movement therebetween, the positioning member may be asymmetric (e.g., an oval) and the interior space of the housing may have a similar asymmetric shape. Providing that the asymmetric interior space is closely toleranced, the asymmetrical positioning member will not rotate therein.

Although the internal features of the housing appear to be integrally molded in the embodiment shown in FIG. 2c, it should be understood that the housing may comprise a number of discrete components. For example, it is within the scope of the invention that the housing comprises an insert which is disposed within a basic housing shell and which provides the closely toleranced cavities to receive the protrusions 6a.

The present invention provides for a simple and effective method for establishing a fiber's radial orientation with respect to the connector housing. In a preferred embodiment, the method comprises the steps of: (a) fixing an optical fiber in a ferrule assembly 1; (b) establishing a first radial position by fixing a first interface 10 between the ferrule assembly and a positioning member 2; (c) establishing a second radial position by fixing a second interface 12 between the positioning member 2 and the housing 8, wherein establishing one of either the first or second radial position comprises radially orientating the fiber with respect to either the positioning member 2 or the connector housing 8 and maintaining such radial position with an interference fit at either the first or second interface. It should be understood that the steps above may be performed in any order. Furthermore, it is anticipated that the first radial position and the second radial position may be established at different times and at different locations. Therefore, it is within the scope of the invention for just portions of the method described herein to be performed.

As mentioned above, preferably, the adjustment interface is the first interface. Thus, in step (b) the fiber's orientation with respect to the positioning member is established by effecting an interference fit between the ferrule assembly and the positioning member. This embodiment has a number of assembly advantages. First, since the first interface is the adjustment interface, the fiber can be orientated outside of the housing as a discrete subassembly. Consequently, this subassembly can be prepared at a different time and location than the assembly of the connector itself. Since fiber orientation is relatively sophisticated process while the final assembly of the connector is a relatively easy process, different work forces of different skill levels can be optimized. For example, the subassemblies can be prepared in an area having a highly skilled but expensive work force, and then shipped to a location having a less-skilled and less-expensive work force for the final assembly of the subassembly into the housing.

Another significant advantage of the first interface being the adjustable interface is that it facilitates the assembly of multiferrule connectors. Specifically, multiple ferrule assemblies can be radially aligned within a single positioning member and then that single positioning member may be installed in a housing.

The preferred method of effecting the interference fit at the first interface 10 is to slide the positioning member over the textured first contact surface 4a of the ferrule assembly 1. As mentioned above, the textured first contact surface 4a will interfere with the aperture to such a degree that radial movement between the ferrule assembly and the positioning member is significantly impeded. Although the use of a ferrule assembly with a textured surface is preferred, other approaches for effecting an interference fit may be used, including, for example, texturing the aperture surface 5a instead of the ferrule assembly, texturing both the first surface 4 and the aperture surface 5a such that the surface anomalies interact and prevent relative radial movement, and shrink fitting the positioning member around the ferrule assembly using known shrink fitting techniques (e.g., expanding the positioning member by heating it and then sliding it over the ferrule assembly such that when the positioning member cools it contracts and tightens around the ferrule assembly).

Orientating the fiber to the connector housing may be performed using different techniques. For example, for cases in which the characteristics of the fiber/ferrule that requires radial positioning are visually detectable (e.g., polarization maintaining fibers and beveled end faces for angled physical contact), it may be preferable to orientate the fiber visually. With this approach, step (b) of the method comprises the additional steps of: (i) viewing the fiber through a microscope to identify the polarization maintaining axis of the fiber (not shown) or the orientation of the fiber's beveled end face; (ii) altering the radial position of the positioning member 2 relative to the microscope to effect proper radial alignment of the polarization maintaining axis with the positioning member; and (iii) effecting the first interface 10. Preferably, step (ii) involves holding the positioning member fixed with respect to the microscope and rotating the ferrule assembly until the desired orientation is achieved.

This approach is preferred if the positioning member has features (e.g., protrusions) which facilitate its placement within the housing in a predetermined radial position. That is, the same features may be used also to position the positioning member in a particular predetermined position with respect to the microscope as well. It should be understood, however, that the present invention is not limited to this approach and that the fiber may be held stationary relative to the microscope and the positioning member moved instead.

For cases in which the characteristics of the fiber/ferrule that requires radial positioning are not visually detectable (e.g., asymmetry on the ferrule surface including apex offset and bore hole misalignment) or in which visual inspection of the fiber/ferrule is otherwise undesirable, it may be preferable to orientate the fibers using active alignment. With this approach, step (b) of the method comprises the additional steps of: (i) optically coupling the ferrule assembly to a test ferrule assembly (not shown); (ii) measuring light transmittance between the ferrule assembly 1 and a test ferrule assembly (not shown); (iii) rotating the ferrule assembly 1 relative to the housing until light transmittance is maximized; and (iv) effecting at least one of either the first interface or the second interface to maintain the radial orientation of the fiber assembly with the housing. In a preferred embodiment, as mentioned above, it is the first interface that is adjustable and it would be adjusted until light transmittance is maximized.

What is claimed is:

1. An optical fiber assembly kit comprising:
a ferrule assembly having at least one bore hole to receive an optical fiber and a first contact surface;
a positioning member having a second contact surface comprising key protrusions, and an aperture adapted to receive said ferrule assembly, wherein said first contact surface and said aperture are configured to form a first interface in which a first radial position relationship between said ferrule assembly and said positioning member is maintained, said first interface being an interference fit such that said first radial position relationship is adjustable in increments less than a quarter rotation; and
a housing having a substantially square cross section and an interior cavity adapted for receiving said positioning member and said ferrule assembly, said housing and said second surface of said positioning member are configured to form a second interface such that said key protrusions seat at diametrically opposed corners of said housing to maintain a second radial position relationship between said positioning member and said housing, said second radial position relationship being predetermined.

2. The kit of claim 1, wherein said increments are less than 10°.

3. The kit of claim 1, wherein the interface associated with said first radial position relationship has no predetermined radial position relationships.

4. The kit of claim 3, wherein said first radial position relationship is essentially infinitely adjustable.

5. The kit of claim 1, wherein said first interface comprises textured surfaces which minimizes sliding therebetween.

6. The kit of claim 5, wherein said first contact surface is a splined surface and said aperture is deformable around the splines.

7. The kit of claim 5, wherein said first contact surface has a polygonal cross section and defines a plurality of edges, and said aperture is deformable about said edges.

8. The kit of claim 7, wherein the second interface comprises a predetermined keyed fit.

9. The kit of claim 1, wherein said second interface comprises a predetermined keyed fit.

10. The kit of claim 9, wherein said second contact surface comprises key protrusions that interact with the housing.

11. An optical fiber assembly comprising:
an optical fiber;
a ferrule assembly having a first contact surface and at least one bore hole in which said optical fiber is disposed;
a positioning member having a second contact surface comprising key protrusions, and an aperture in which said ferrule assembly is disposed thereby defining a first interface in which a first radial position relationship between said ferrule assembly and said positioning member is maintained, said first interface being an interference fit such that said first radial position relationship is adjustable in increments less than a quarter rotation; and
a housing a substantially square cross section and a cavity in which said positioning member and said ferrule assembly are disposed, said housing and said second surface of said positioning member define a second interface such that said key protrusions seat at diametrically opposed corners of said housing to maintain a second radial position relationship between said positioning member and said housing, said second radial position relationship being predetermined.

12. The assembly of claim 11, wherein said fiber is a polarization maintaining fiber.

13. The assembly of claim 11, wherein said fiber has a beveled end face.

14. A method of assembling an optical fiber assembly comprising the steps of:
(a) fixing an optical fiber in a ferrule assembly;
(b) establishing a first radial position by at least (i) optically coupling the ferrule assembly to a test ferrule assembly; (ii) measuring light transmittance between the ferrule assembly and a test ferrule assembly; (iii) rotating the ferrule assembly relative to a position member until light transmittance is maximized; and (iv) fixing a first interface between said ferrule assembly and said positioning member, said first interface being an interference fit which is adjustable in increments less than a quarter rotation; and
(c) establishing a second radial position by fixing a second interface between said positioning member and a housing.

15. The method of claim 14, wherein optimizing optical coupling comprises maintaining polarization.

16. The method of claim 14, wherein said first interface is adjustable.

17. The method of claim 16, wherein said optical fiber has a beveled end face.

18. The method of claim 14, wherein said optical fiber has a beveled end face.

19. The method of claim 14, wherein the steps of forming the first and second interfaces are performed by different workers.

20. The method of claim 19, wherein the steps of forming the first and second interfaces are performed by different workers at different locations.

21. A method of assembling an optical fiber assembly comprising the steps of:
(a) fixing an optical fiber in a ferrule assembly;
(b) establishing a first radial position by fixing a first interface between said ferrule assembly and a positioning member, said first interface being an interference fit which is adjustable in increments less than a quarter rotation; and
(c) establishing a second radial position by fixing a second interface between said positioning member and a housing, wherein said first and second interfaces are fixed by different workers.

* * * * *